(12) United States Patent
Atherton

(10) Patent No.: US 8,400,643 B2
(45) Date of Patent: Mar. 19, 2013

(54) DISPLACEMENT SENSOR USING MULTIPLE POSITION SENSITIVE PHOTODETECTORS

(75) Inventor: Kim Atherton, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 202 days.

(21) Appl. No.: 13/088,267

(22) Filed: Apr. 15, 2011

(65) Prior Publication Data

US 2012/0262733 A1    Oct. 18, 2012

(51) Int. Cl.
    *G01B 11/14*    (2006.01)
(52) U.S. Cl. ......................... 356/623; 356/621
(58) Field of Classification Search ........... 356/600–640
    See application file for complete search history.

(56) References Cited

U.S. PATENT DOCUMENTS

| | | | |
|---|---|---|---|
| 4,120,093 A | 10/1978 | Spies | |
| 4,338,722 A | 7/1982 | Delmas | |
| 4,812,635 A * | 3/1989 | Kaufmann et al. | 356/621 |
| 4,827,436 A | 5/1989 | Sabersky | |
| 4,938,062 A | 7/1990 | Shimizu | |
| 6,771,377 B2 * | 8/2004 | Jones et al. | 356/616 |
| 7,122,818 B2 | 10/2006 | Kitamura | |
| 7,526,967 B2 | 5/2009 | Glueck | |
| 7,847,817 B2 | 12/2010 | Negishi | |
| 7,894,079 B1 * | 2/2011 | Altendorf et al. | 356/614 |
| 2007/0010714 A1 | 1/2007 | Negishi | |

* cited by examiner

*Primary Examiner* — Gregory J Toatley
*Assistant Examiner* — Jarreas C Underwood
(74) *Attorney, Agent, or Firm* — Christensen O'Connor Johnson Kindness PLLC

(57) ABSTRACT

A position sensing device having a high range to resolution ratio comprises a light source arrangement, a moving aperture arrangement and a multiple position sensitive detector (PSD) arrangement. The multiple PSD arrangement comprises a plurality of position sensitive detectors arranged along at least two detection tracks along a measuring axis. Each of the plurality of position sensitive detectors shares a common portion of a total measuring range along the measuring axis with an adjacent position sensitive detector which is on a different detector track. The total measurement range is larger than the detector range of each of the position sensitive detectors.

19 Claims, 5 Drawing Sheets

DISPLACEMENT SENSOR USING MULTIPLE POSITION SENSITIVE PHOTODETECTORS

FIELD OF THE INVENTION

The present invention relates to displacement sensors, and more particularly, to a displacement sensing configuration that generates desirable displacement signals having a high range to resolution ratio using position sensitive photodetectors.

BACKGROUND OF THE INVENTION

In some applications, it is desirable to provide an optical displacement sensor which provides a linear displacement signal, in a manner analogous to that of LVDT-type sensors. One prior art system of this type is disclosed in U.S. Pat. No. 4,338,722 (the '722 patent), issued to Delmas, which is hereby incorporated by reference in its entirety. The '722 patent discloses a sensor with a light source, a detector comprising two photoreceiver detectors, and a moving stem with an opening to transmit light from the light source to the detectors. The moving stem slides between two guides. A cover over the opening on the moving stem is designed to be substantially symmetrical with the contact tip at the stem end relative to the center point between the two guides, as a means of eliminating measurement sensitivity to mechanical play of the stem. U.S. Pat. No. 4,812,635 (the '635 patent), issued to Kaufmann et al., which is hereby incorporated by reference in its entirety, provides a means for homogenous illumination in a position sensing device. The device of the '635 patent includes a light source, two photodiodes, and a moving diaphragm which contains an aperture. The two photodiodes produce a signal determined by the position of the light which passes to them from the light source through the aperture on the diaphragm. The means for homogenous illumination comprises a correction filter along the optical path, which in the preferred embodiment comprises a film negative exposed using the light source at its nominal spacing. Such a custom filter outputs illumination which nominally has a uniform intensity. However, the devices of the '722 and '635 patents suffer from remaining unrecognized errors associated with their light sources, which lead to signal nonlinearity and/or accuracy errors which limit their range to resolution ratio.

A high range to resolution ratio is a valuable performance characteristic of an analog optical position sensing device. U.S. Pat. No. 7,894,079 (the '079 patent) provides a range to resolution ratio which may be superior to that achievable by the devices of the '722 and '635 patents. The optical position sensing device of the '079 patent uses an advanced aperture configuration and a position sensitive detector for reliable, high resolution measurement. However, the device of the '079 patent also suffers from an undesirably limited range to resolution ratio. An optical position sensing device which provides an improved range to resolution ratio would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A position sensing device, according to principles outlined herein, provides an increased range with an increased range to resolution ratio. In various embodiments, the position sensing device comprises a light source arrangement configured to radiate source light along a source light path the light source arrangement comprising at least a light generating portion; a moving aperture arrangement constrained to move along a measuring axis direction and located to receive the source light along a source light path, the moving aperture arrangement including an aperture configuration that inputs the source light and outputs measurement light to first and second detection tracks which are aligned along the measuring axis direction and are spaced apart transverse to the measuring axis direction, the measurement light moving along the measuring axis direction corresponding to a position of the aperture configuration along the measuring axis direction, the aperture configuration movable at least over a total measuring range MR along the measuring axis direction; and a multiple position sensitive detector (PSD) arrangement. The multiple PSD arrangement comprises a first position sensitive detector comprising a photodetector having a sensitive axis aligned along the first detection track to receive measurement light from the aperture configuration and a second position sensitive detector comprising a photodetector having a sensitive axis aligned along the second detection track to receive measurement light from the aperture configuration. The first position sensitive detector and the second position sensitive detector are arranged such that during operation, the first position sensitive detector outputs a first displacement signal over a first detector range that is less than the total measuring range MR. During operation, the second position sensitive detector outputs a second displacement signal over a second detector range that is less than the total measuring range MR. The first and second detector ranges share a common portion of the total measuring range MR.

As used herein, the term position sensitive detector (PSD) refers to an optical position sensor that can measure the position of a light spot on its sensing surface along the measurement axis direction. In various embodiments, the position of the light spot is indicated by an analog displacement signal that varies continuously depending on the position of light spot. In some embodiments, the analog displacement signal may be derived from a differential signal measurement, based on signals Sa and Sb present at opposite ends of the PSD along the measurement axis direction. In some embodiments, the displacement signal SPSD may be a linear function of position which follows the form SPSD=K[(Sa−Sb)/(Sa+Sb)], for example. However, in other embodiments, a PSD signal may follow other known forms.

In some embodiments, the aperture configuration may comprise a first aperture and a second aperture configured to receive source light and output measurement light which forms a first measurement spot and a second measurement spot along the first and second detector tracks, respectively. In some embodiments, the first position sensitive detector and the second position sensitive detector may each have a width which is at least twice the width of the first measurement spot and the second measurement spot, respectively. In some embodiments, the first position sensitive detector and the second position sensitive detector may each have a width which is at least three times the width of the first measurement spot and the second measurement spot, respectively.

In some embodiments, the common portion may span a dimension along the measuring axis direction which is larger than each of the first and second measurement spots.

In some embodiments, the multiple PSD arrangement may further comprise at least a third position sensitive detector comprising a photodetector having a sensitive axis aligned along the first detection track to receive measurement light from the aperture configuration; the second position sensitive detector and the third position sensitive detector may be arranged such that during operation the second position sensitive detector outputs the second displacement signal over the second detector range, and the third position sensitive detector outputs a third displacement signal over a third detector range that is less than the total measuring range MR and different than the first and second detector ranges; and the second and third detector ranges may share a common portion of the total measuring range MR.

In some such embodiments, the multiple PSD arrangement further may comprise at least a fourth position sensitive detector comprising a photodetector having a sensitive axis aligned along the second detection track to receive measurement light from the aperture configuration; the third position sensitive detector and the fourth position sensitive detector may be arranged such that during operation the third position sensitive detector outputs the third displacement signal over the third detector range, and the fourth position sensitive detector outputs a fourth displacement signal over a fourth detector range that is less than the total measuring range MR and different than the first, second and third detector ranges; and the third and fourth detector ranges may share a common portion of the total measuring range MR.

In some embodiments, the light source arrangement may be fixed relative to the multiple PSD arrangement.

In some embodiments, the light source arrangement may be configured to move with the moving aperture arrangement.

In some embodiments, the aperture configuration may have an optical axis approximately perpendicular to the measuring axis, and the source light path may be approximately parallel to the measuring axis, and the moving aperture arrangement may comprise a first turning minor that is fixed to the moving aperture arrangement and which receives source light along the source light path and deflects it along the optical axis to the aperture configuration. In some embodiments, the moving aperture arrangement may comprise a diffuser arranged between the first turning mirror and the aperture configuration. In some embodiments, the light source arrangement may comprise a second turning mirror which receives source light from the light generating portion and deflects it along the source light path to the first turning mirror. In some embodiments, the light source arrangement may be fixed relative to the multiple PSD arrangement.

In some embodiments, the light source arrangement may comprise a diffuser arranged to receive light from the light generating portion and radiate diffuse source light along the source light path.

In some embodiments, the aperture configuration may comprise a single aperture configured to receive source light and output measurement light which forms a single measurement spot with a width that covers both the first detector track and the second detector track.

In some embodiments, the aperture configuration may be configured to input the source light and output the measurement light to first, second and third detection tracks which are aligned along the measuring axis direction and are spaced apart transverse to the measuring axis direction; the multiple PSD arrangement may further comprise at least a third position sensitive detector comprising a photodetector having a sensitive axis aligned along the third detection track to receive measurement light from the aperture configuration; the second position sensitive detector and the third position sensitive detector may be arranged such that during operation, the second position sensitive detector outputs the second displacement signal over the second detector range, and the third position sensitive detector outputs a third displacement signal over a third detector range that is less than the total measuring range MR and different than the first and second detector ranges; and the second and third detector ranges may share a common portion of the total measuring range MR. In some such embodiments, the aperture configuration may comprise a first aperture, a second aperture, and a third aperture configured to receive source light and output measurement light which forms a first measurement spot, a second measurement spot, and a third measurement spot along the first, second, and third detector tracks, respectively.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
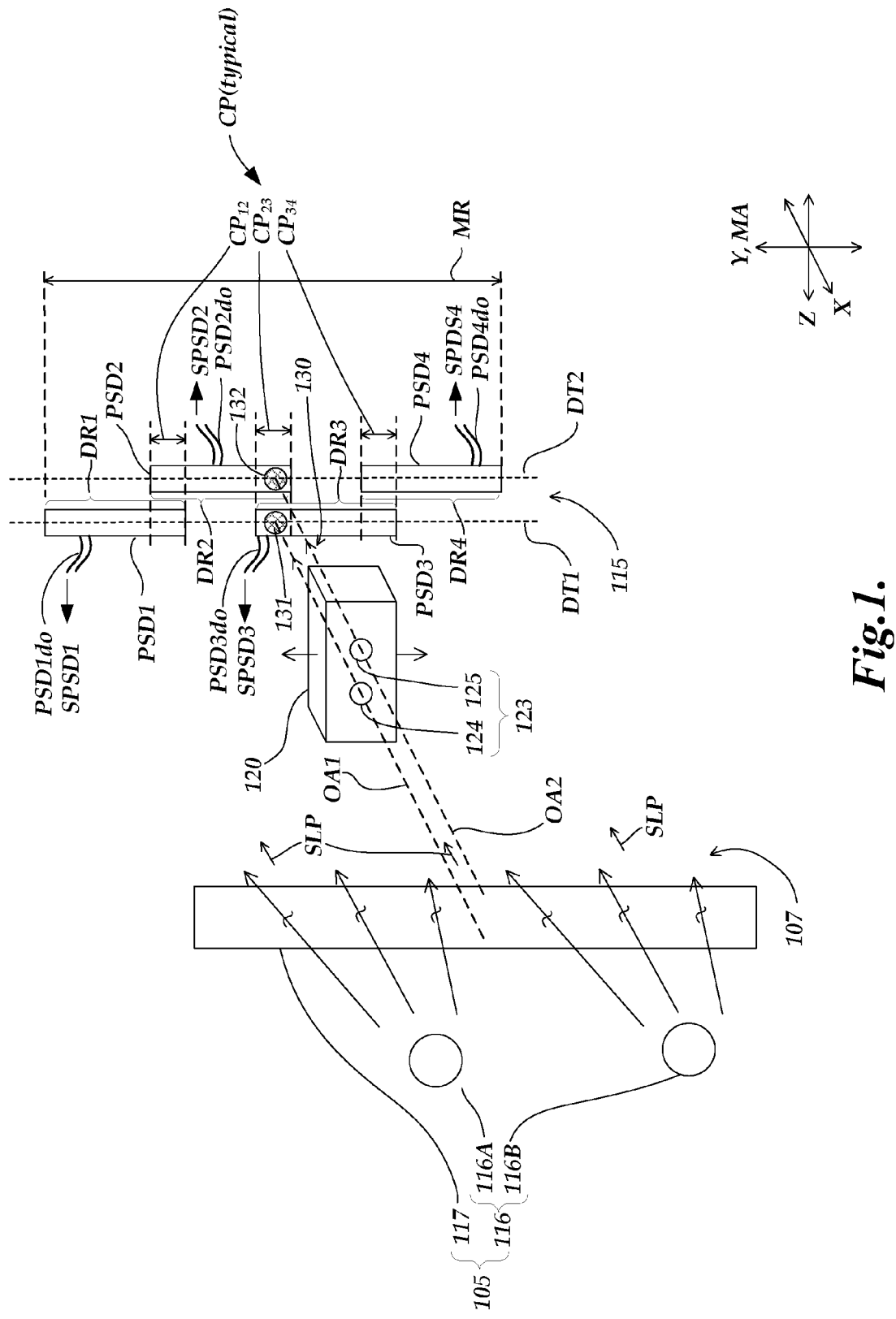
FIG. 1 is an exploded isometric view diagram of a first embodiment of a position sensing device including features of the invention.

FIG. 1 is an exploded schematic isometric view diagram of a first embodiment of a position sensing device 100 including features of the invention. The position sensing device 100 comprises a light source arrangement 105, a moving aperture arrangement 120, and a multiple position sensitive detector (PSD) arrangement 115. FIG. 1 shows an orthogonal X, Y, Z coordinate system for reference. A measuring axis direction MA of the device 100 is parallel to the Y axis direction, and the moving aperture arrangement 120 is constrained to move along the measuring axis direction MA. In the embodiment shown in FIG. 1, an optical axis OA of an aperture configuration 123 included on the moving aperture arrangement 120 may be approximately perpendicular to the measuring axis direction MA, and the X axis direction may be parallel to the optical axis OA. A sensing surface plane of the multiple PSD arrangement 115 may be approximately parallel to the Y-Z plane.

The light source arrangement 105 comprises a light generating portion 116 and may comprise a diffuser 117. The light generating portion 116 may comprise a first light source 116A and a second light source 116B, such that the light source arrangement 105 has an extended dimension along the measuring axis direction MA, which allows it to be fixed relative to the multiple PSD arrangement 115 and at the same time illuminate the moving aperture arrangement 120 throughout the measuring range MR. When the diffuser 117 is used, it may enhance the uniformity of the resulting source light, which may be used in conjunction with certain aperture designs to improve measurement accuracy as taught in the '079 patent. In some embodiments, the diffuser 117 may comprise an approximately Lambertian diffuser (e.g., an opal glass diffuser). Other embodiments may use a more efficient diffuser that diffuses light with a more uniform intensity over an angular range that is more limited relative to the optical axis direction (e.g., a holographic diffuser). It should be appreciated that the light source arrangement 105 shown in FIG. 1 is exemplary only, and not limiting. For example, in some embodiments, the light generating portion 116 provide quasi-diffuse or non-diffuse light and/or may include a light generating portion comprising an OLED or other light-emitting material that emits diffuse source light directly from a light-emitting surface. Alternative light source arrangements, which may be used in various embodiments of position sensing devices including features of the invention, are described further below.

The moving aperture arrangement 120 includes an aperture configuration 123 which, in this particular embodiment, comprises a first aperture 124 and a second aperture 125. The aperture configuration 123 is movable at least over the measuring range MR along the measuring axis direction MA.

The multiple position sensitive detector arrangement 115 comprises position sensitive detectors (PSDs) PSD1, PSD2, PSD3, and PSD4 which each have a respective sensitive axis aligned along a detection track. In this example, the odd-numbered PSDs are aligned along a first detection track DT1 and the even-numbered PSDs are aligned along a second detection track DT2. The first detection track DT1 and the second detection track DT2 are each aligned along the measuring axis direction MA and are spaced apart transverse to the measuring axis direction MA. Each of the position sensitive detectors is located to receive measurement light 130 from the moving aperture configuration 123 over a portion of the measuring range MR.

In operation, the light source arrangement 105 is configured to radiate diffuse source light 107 generally along the direction of a source light path SLP. The moving aperture arrangement 120 receives the source light 107 and the aperture configuration 123 inputs the source light 107 and outputs measurement light to the first and second detection tracks DT1 and DT2. In this particular embodiment, the first aperture 124 inputs the source light 107 and outputs measurement light along its optical axis OA1 to form a first measurement spot 131 along the first detector track DT1. Similarly, the second aperture 125 inputs the source light 107 and outputs measurement light along its optical axis OA2 to form a second measurement spot 132 along the second detector track DT2. The first and second measurement spots 131 and 132 are shown in one exemplary position along the measuring axis MA in FIG. 1. It will be appreciated that the measurement light 130 and the first and second measurement spots 131 and 132, move along the measuring axis direction MA corresponding to a position of the aperture configuration 123 along the measuring axis direction MA. The photodetectors of each of the position sensitive detectors PSD1, PSD2, PSD3, and PSD4 are aligned along one of the detector tracks to receive the measurement light 130 (e.g., one of the measurement spots 131, 132) from the aperture configuration 123 and output respective displacement signals SPSD1, SPSD2, SPSD3, and SPSD4 on respective signal output connections PSD1do, PSD2do, PSD3do, and PSD4do. Each of the PSDs output their displacement signal(s) over a respective detector range DR (e.g., DR1, DR2, and so on) that is less than the measuring range MR. In some embodiments, each displacement signal may be derived from a differential signal measurement based on signals Sa and Sb present at opposite ends of the PSD along the measurement axis direction. In one embodiment, the displacement signal SPSD1 may comprise differential signal pair Sa1, Sb1 on the respective signal output connections PSD1do, for example. In some embodiments, the displacement signal SPSD may be a linear function of position which follows the form SPSD=K[(Sa−Sb)/(Sa+Sb)], for example. However, in other embodiments, a PSD signal may follow other known forms. It will be appreciated that if each PSD is operated using known methods (e.g., such as those disclosed in the '079 patent) to provide the best possible resolution over its respective detector range DR (e.g., the detector range DR1 for PSD, PSD1, and so on), then the arrangement of PSDs in the multiple PSD arrangement 115 provides displacement signals that can be combined to provide a range to resolution ratio that is greater than that achievable by using a single PSD in a compact and economical configuration.

It will be appreciated that each respective PSD in the multiple PSD arrangements disclosed herein shares a common portion CP of the measuring range MR with another PSD. For example, as shown in FIG. 1, the first position sensitive detector PSD1 shares a common portion $CP_{12}$ of the measuring range MR with the second position sensitive detector PSD2. Thus, for positions within a common portion CP, two measurements signals are provided from the corresponding adjacent PSDs, allowing an uninterrupted transition between their high resolution displacement signals as the displacement position transitions from the detector range of a first one of the PSDs (e.g., DR1) to a detector range of the second one of the PSDs (e.g., DR2) which share that common portion CP (e.g., $CP_{12}$) of the measuring range. The displacement signals of the PSDs are explained in greater detail below with reference to FIG. 2.

The signal processing related to the transition between the two high resolution displacement signals of adjacent PSDs may be simplified when the two signals are changing only as a function of position, and not changing due to a measurement spot moving off the end of one of the PSDs, for example. For example, this may provide two signals that are both linear functions of displacement over part of the common portion CP, and such signal may be more easily compared, analyzed, and/or averaged, or the like. Thus, in various embodiments it may be advantageous for the common portion CP (typical) to span a dimension along the measuring axis direction MA which is larger than the measurement light (e.g., larger than the first measurement spot 131 and the second measurement spot 132) along the measuring axis direction.

It should be appreciated that alternative aperture arrangements may be used in various embodiments disclosed herein. For example, in some embodiments, an aperture arrangement may comprise a single aperture configured to receive source light and output measurement light which forms a single measurement spot with a width which covers both the first detector track and the second detector track, as outlined below with reference to FIG. 3. In some embodiments, an aperture arrangement may comprise three or more apertures, such that the aperture arrangement outputs measurement light comprising three or more measurement spots, which are incident upon three or more detection tracks that are spaced apart transverse to the measuring axis direction. In the embodiment shown in FIG. 1, the first aperture 124 and the second aperture 125 are circular. It should be appreciated that different shapes of apertures may be used. For example, an embodiment of an aperture arrangement with a single aperture may comprise a rectangular aperture.

In some embodiments, it is advantageous for each of the PSDs to have a width which is larger than the first measurement spot 131 and the second measurement spot 132 along a direction transverse to the measuring axis direction MA. It will be appreciated that such a configuration allows for a measurement spot to be located consistently within the photodetectors of the PSDs, in order to provide the expected and/or calibrated signal despite misalignment tolerances of the aperture arrangement 123 and/or the multiple PSD arrangement 115 transverse to the measuring axis direction MA. In some embodiments, each of the position sensitive detectors have a width which is at least twice or even three times the width of the first measurement spot 131 and the second measurement spot 132 along a direction perpendicular to the measuring axis direction MA.

In the embodiment shown in FIG. 1, the multiple PSD arrangement 115, including position sensitive detectors PSD1, PSD2, PSD3, and PSD4, is fixed relative to the light source arrangement 105. It should be appreciated that in alternative embodiments, a compact light source arrangement may move with the moving aperture arrangement along the measuring axis direction MA. Such an alternative embodiment may have the disadvantage of requiring moving wires or flexprint, or the like, but may provide an improved range to resolution ratio as outlined above and/or further below. Various other light source arrangements are outlined with reference to later figures.

Figure 2:
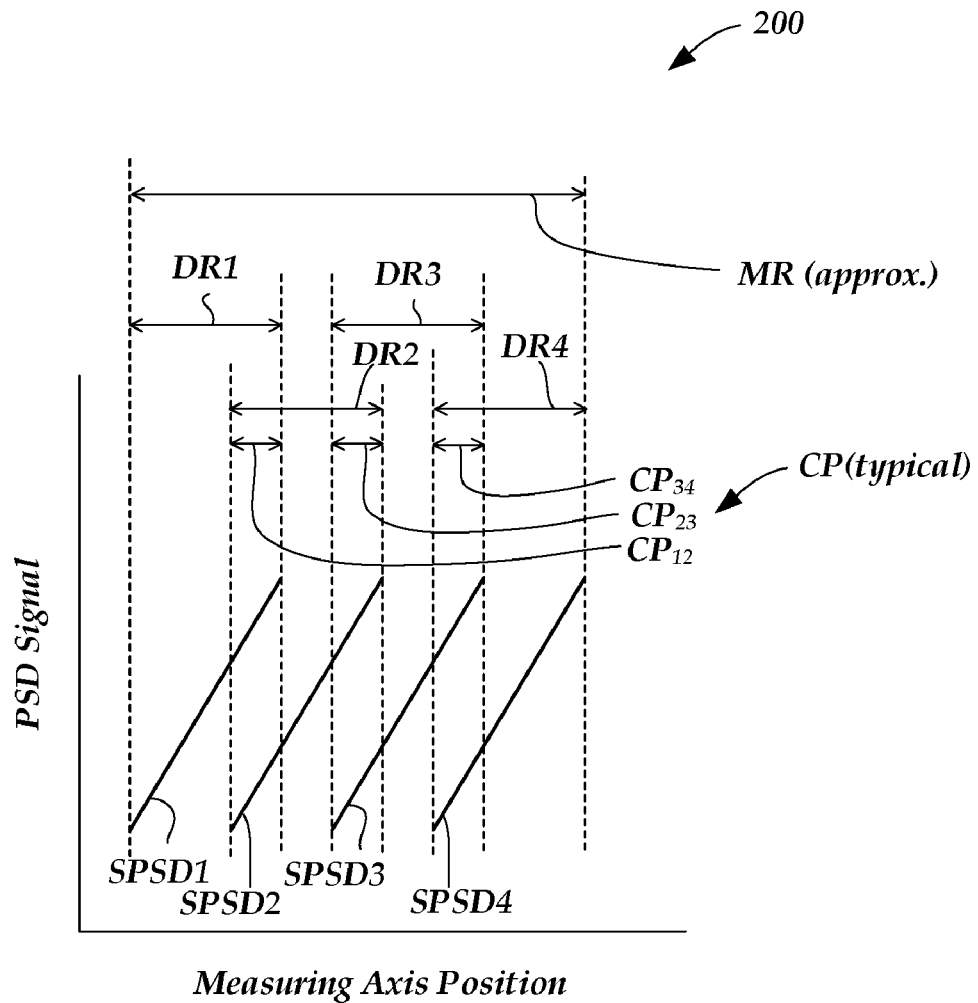
FIG. 2 is a signal chart showing features of some exemplary displacement signals provided by a position sensing device including features of the invention.

FIG. 2 is a signal chart 200 showing features of some exemplary displacement signals provided by a position sensing device including features of the invention, such as the position sensing device 100 of FIG. 1, for example. The signal chart is slightly idealized, in that the non-linear effect of the measurement light running off the end of an individual PSD is ignored, in order to emphasize the basic principles outlined below. It may be understood that a valid detector range DRx may be limited by signal processing, to exclude such effects, in various embodiments. For the example shown in FIG. 2, each of the displacement signals SPSD1, SPSD2, SPSD3, and SPSD4 varies as a function of the measurement light position along the measuring axis direction MA (e.g., as a function of the position of one of more light spots along the detector tracks DT1 and DT2). As previously shown in FIG. 1, the first position sensitive detector PSD1 shares a common portion $CP_{12}$ of the measuring range MR with the second position sensitive detector PSD2. Or, stated another way, a first detector range DR1 of the PSD1 overlaps with a second detector range DR2 of the position sensitive detector PSD2 at a common portion $CP_{12}$. Therefore, as shown in FIG. 2, in that common portion $CP_{12}$, the first position sensitive detector PSD1 and the second position sensitive detector PSD2 each output displacement signals SPSD1 and SPSD2, which are indicative of a position along the measuring axis direction MA, and so on, for the other common portions CP. In order to provide displacement signals without gaps along the measuring range MR, each respective PSD shares a common portion of the measuring range MR with another PSD. As previously outlined, in some embodiments, each of the displacement signals SPSD1, SPSD1, SPSD3, and SPSD4 may vary approximately linearly as a function of the measurement light position "P". For example, the displacement signals SPSDx may comprise differential signal pair Sax, Sbx and the displacement signal SPSDx may follow the form SPSDx(P)=$K_x$ [(Sax−Sbx)/(Sax+Sbx)], where x is 1, 2, 3, or 4, corresponding to various detectors. In order to provide a continuous signal over the total measuring range, the various constants $K_x$ may be determined by design or calibration. In one embodiment, within each common portion CP, the signal processing may transition between determining the position based on the output of a first PSD to determining the position based on the output of an adjacent second PSD whenever the output of the first PSD exceeds an upper or lower signal limit that occurs within the common portion. If the slope or the offset of the displacement signals SPSD1, SPSD2, SPSD3, and SPSD4 are not perfectly stable, they may be determined in real time relative to one another based on analysis of the two signals that are present throughout each common portion, such that a smooth position measurement change may be provided as a function of displacement through a common portion, despite minor changes in output due to drift or environmental factors.

It should be appreciated that for a position sensing device with a single position sensitive detector (e.g., as disclosed in the '079 patent), simply providing a position sensitive detector which is longer will improve the range of such a position sensing device. However, the range to resolution ratio of such a device will suffer. In contrast, the position sensing device 100, and other embodiments disclosed herein, allow for a longer measurement range without sacrificing resolution, in a compact and economical configuration. As shown in FIGS. 1 and 2, the total measurement range MR of a device including 4 PSDs in multiple PSD arrangement may be approximately [DT1+DT2+DT3+DT4−$CP_{12}$−$CP_{23}$−$CP_{34}$] minus the size of the measurement light spot along the measurement axis direction MA. The resolution need not decrease as the total measuring range MR is increased by adding detectors, since the individual PSD signals and/or measurements may be determined independently. In principle, any number of detectors can be added while using only two compactly arranged detector tracks. However, in practice, in some cases it may be more practical to follow the principles outlined above but arrange the PSDs in a multiple PSD arrangement by staggering them along three or more detector tracks that receive measurement light and that are spaced apart transverse to the measuring axis direction MA (e.g., this may be advantageous for arranging PSDs that have a short dimension along the measuring axis direction MA and in comparison to the size of a measurement light spot).

Figure 3:
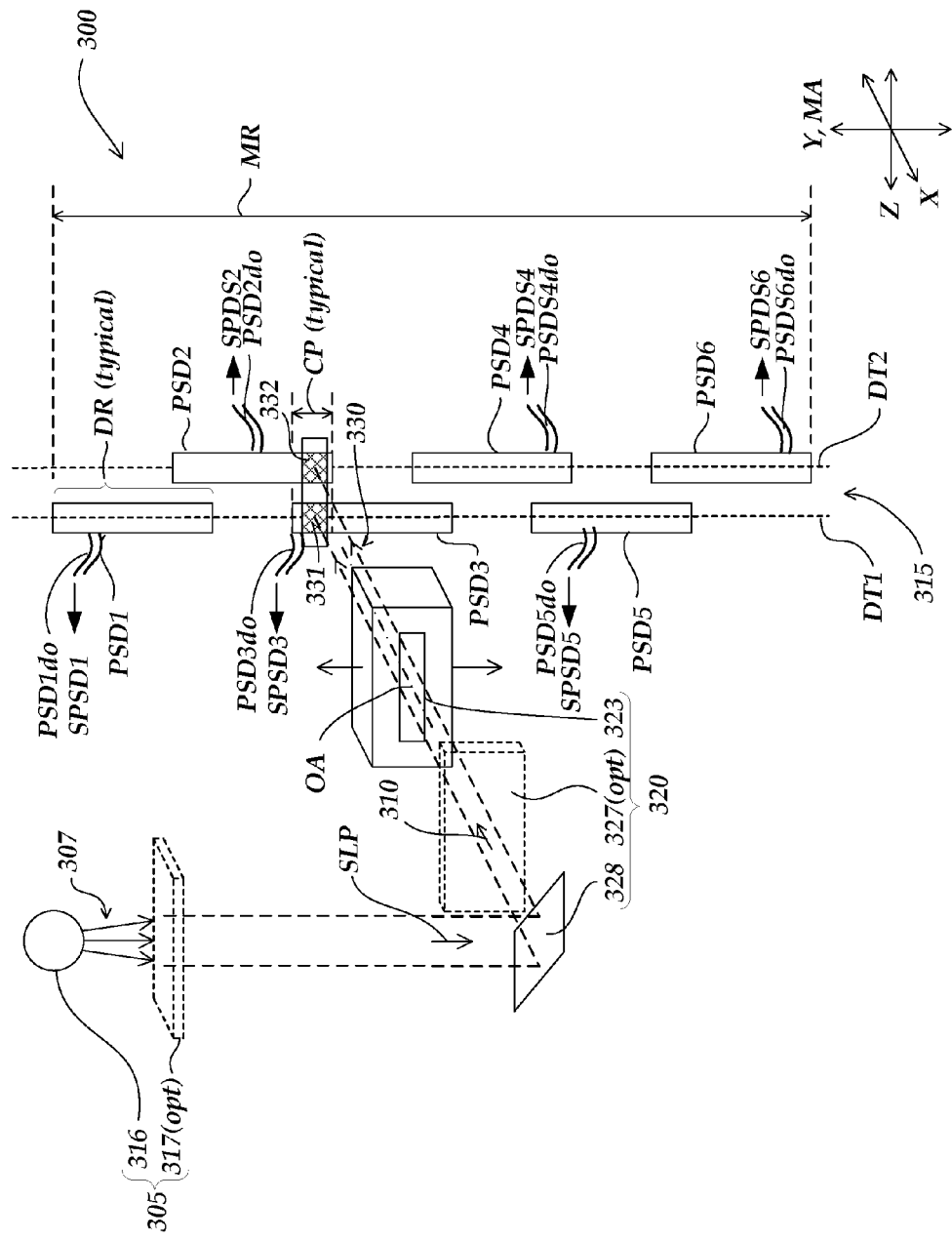
FIG. 3 is an exploded isometric view diagram of a second embodiment of a position sensing device including features of the invention.

FIG. 3 is an exploded schematic isometric view diagram of a second embodiment of a position sensing device 300 including features of the invention. Elements with 3XX series numbers in FIG. 3 that have the same "XX" suffix as 1XX series numbers in FIG. 1 may designate similar or identical elements unless otherwise indicated. Thus, the operation of the position sensing device 300 may generally be understood by analogy with FIG. 1, and only certain aspects of operation will be described here.

The position sensing device 300 comprises a light source arrangement 305, a moving aperture arrangement 320, and a multiple PSD arrangement 315. The light source arrangement 305 comprises a light generating portion 316 and may comprise a diffuser 317. In contrast to the embodiment of FIG. 1, the light source arrangement 305 is arranged to radiate source light 307 generally along the direction of a source light path SLP which is parallel to the measuring axis direction MA. This configuration allows it to be fixed relative to the multiple PSD arrangement 315 and at the same time illuminate a first turning mirror 328 of the moving aperture arrangement 320 throughout the measuring range MR. When the diffuser 317 is used, it may enhance the uniformity of the source light 307 at the expense of lost efficiency in transmitting the source light to the turning minor 328. Therefore, in this embodiment, it may be advantageous to omit the diffuser 317 and to concentrate and collimate the source light 307 along the source light path SLP.

In the embodiment shown in FIG. 3, the moving aperture arrangement 320 comprises the turning mirror 328, the aperture configuration 323, and may comprise an optional diffuser 327 located between the turning mirror 328 and the aperture configuration 323. The elements of the moving aperture arrangement 320 are fixed relative to one another, and constrained to move as a group along the measuring axis MA, similarly to the previously outlined moving aperture arrangement 120. In operation, the turning mirror 328 receives the source light 307 along the source light path SLP, regardless of position along the measuring axis direction MA, and outputs it along an internal light path 310 that translates along the measuring axis direction MA with the moving aperture arrangement 320. The aperture configuration 323 inputs the source light 307 along the internal light path 310 and outputs measurement light 330 to the first and second detection tracks DT1 and DT2. In this particular embodiment, the aperture configuration 323 comprises a single wide aperture which forms the measurement light 330 into a single wide measurement spot that spans both the first and second detector tracks DT1 and DT2. It will be appreciated that such a configuration allows for such a measurement spot to consistently cover the entire width of the photodetectors of the PSDs in lighted detector regions 331 and 332, in order to provide the expected and/or calibrated signal despite misalignment tolerances of the aperture arrangement 323 and/or the multiple PSD arrangement 315 transverse to the measuring axis direction MA. When the diffuser 327 is used, it may enhance the uniformity of the resulting measurement light 330. The diffuser 327 may be used in conjunction with certain aperture designs to improve measurement accuracy as taught in the '079 patent.

In the embodiment shown in FIG. 3, the multiple PSD arrangement 315, includes six PSDs, rather than the four PSDs shown in FIG. 1, in order to provide a longer total measuring range MR. However, it will be appreciated that the six PSDs are arranged to provide common portions CP between all pairs of adjacent PSDs, according to previously outlined teachings, and to provide displacement signal(s) SPSDx, which may be used in combination to provide a high resolution spatially continuous (uninterrupted) position measurement along the measuring axis direction MA.

It should be appreciated that in alternative embodiments, a compact light source arrangement similar to the light source arrangement 305 may be attached close to and moving the moving aperture arrangement 320. Such an alternative embodiment may have the disadvantage of requiring moving wires or a flexprint, or the like, but may provide an improved range to resolution ratio as outlined above and/or further below. It will be appreciated that the aperture arrangement 123 of FIG. 1 may be used in place of the aperture arrangement 323 in various embodiments.

Figure 4:
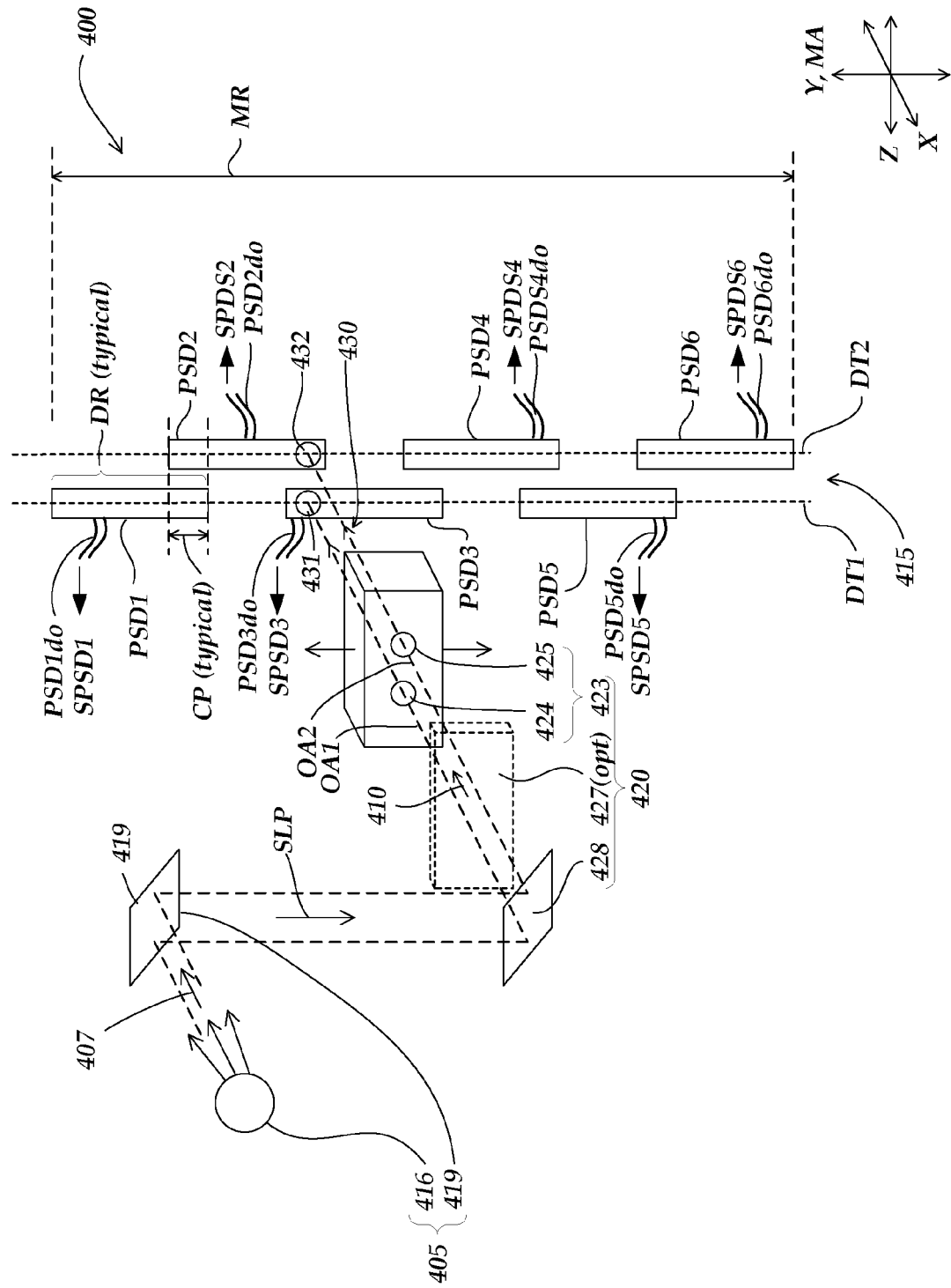
FIG. 4 is an exploded isometric view diagram of a third embodiment of a position sensing device including features of the invention.

FIG. 4 is an exploded schematic isometric view diagram of a third embodiment of a position sensing device 400 including features of the invention. Elements with 4XX series numbers in FIG. 4 that have the same "XX" suffix as 3XX series numbers in FIG. 3 may designate similar or identical elements unless otherwise indicated. Thus, the operation of the position sensing device 400 may generally be understood by analogy with FIG. 3, and only certain aspects of operation will be described here.

The position sensing device 400 comprises a light source arrangement 405, a moving aperture arrangement 420, and a multiple PSD arrangement 415. The light source arrangement 405 comprises a light generating portion 416 and a second turning minor 419. The light source arrangement 405 is arranged to radiate source light 407 from the second turning minor 419 along the direction of a source light path SLP which is parallel to the measuring axis direction MA, allowing it to be fixed relative to the multiple PSD arrangement 415, and at the same time illuminate the first turning minor 428 of the moving aperture arrangement 420 throughout the measuring range MR. Using the second turning mirror 419 may allow a more convenient or economical configuration of the light generating portion 416 of the position sensing device 400, for example, as described in greater detail below with reference to the analogous configuration of FIG. 5.

The configuration and operation of the moving aperture arrangement 420 and the multiple PSD arrangement 415 may be understood based on previously described embodiments.

Figure 5:
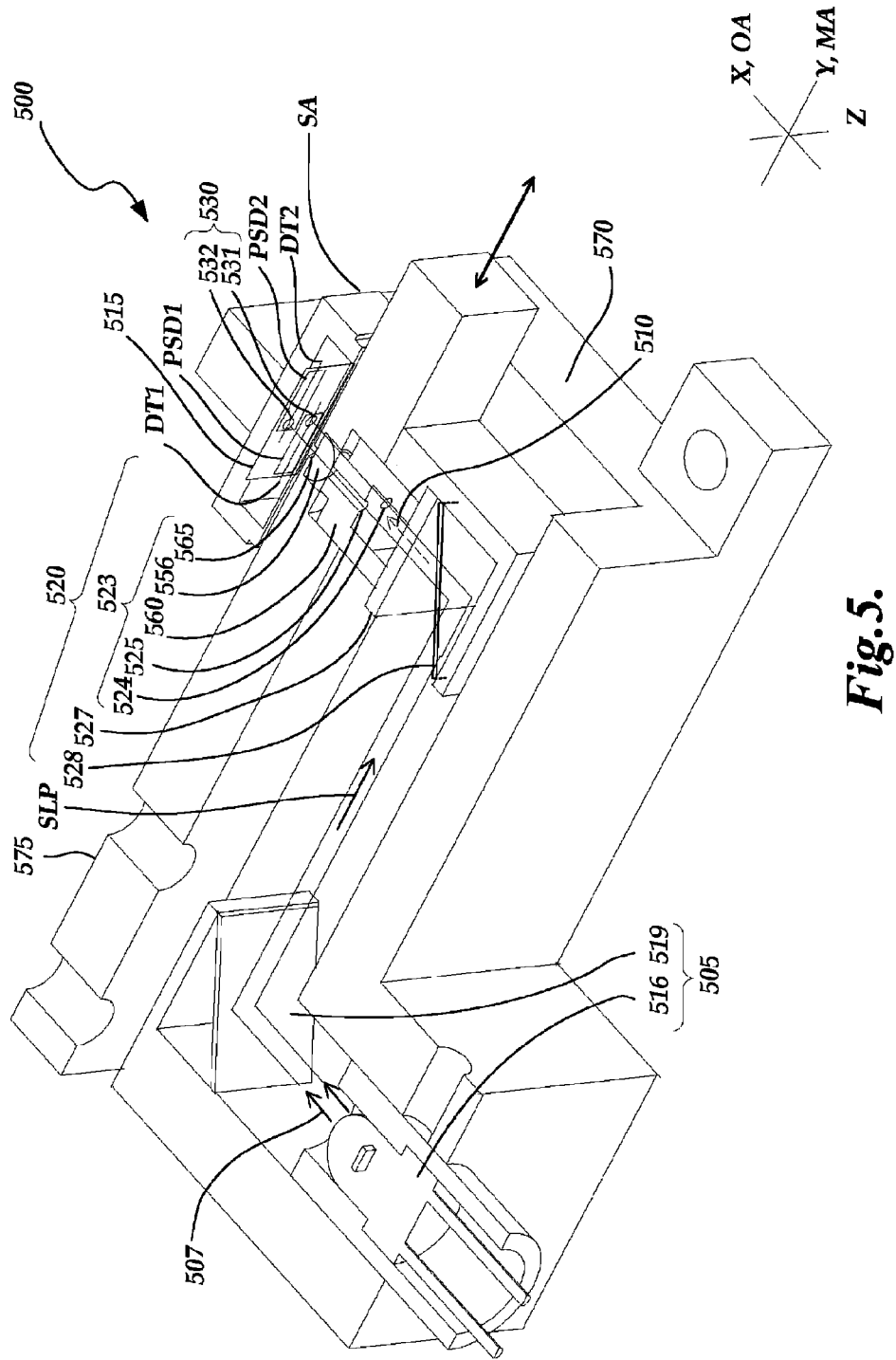
FIG. 5 is an isometric cut away view diagram of a position sensing gauge, which is one practical implementation of a position sensing device similar to the position sensing device that is represented schematically in FIG. 4.

FIG. 5 is an isometric cut away view diagram of a position sensing gauge 500, which is one practical implementation of a position sensing device similar to the position sensing device 400 that is represented schematically in FIG. 4. Elements with 5XX series numbers in FIG. 5 that have the same "XX" suffix as 4XX series numbers in FIG. 4 may designate similar or identical elements unless otherwise indicated. Thus, the operation of the position sensing gauge 500 may generally be understood by analogy with FIG. 4, and only certain aspects of operation will be described here.

As shown in FIG. 5, in addition to the light source arrangement 505, the moving aperture arrangement 520, and the multiple PSD arrangement 515, the position sensing gauge 500 additionally comprises a mounting element 570 and a movable member 575. The light source portion 505 comprises the light generating portion 516 (e.g., a packaged LED) and the second turning mirror 519. The light generating portion 516, the second turning mirror 519, and multiple PSD arrangement 515 are all fixed relative to one another by mounting them to the mounting element 570. The mounting element 570 may also receive bearings or flexures (not shown) that guide the linear motion of the movable member 575 along the measuring axis direction MA. The moving aperture element 520 is mounted to the movable member 575. In the embodiment shown in FIG. 5, the moving aperture element 520 comprises the first turning mirror 528, the optional diffuser 527, and the aperture arrangement 523. The aperture arrangement 523 comprises an aperture body 560, which includes a first aperture 524 and a second aperture 525, lens portion 556, and an exit aperture(s) 565 provided in the movable member 575, which may be a limiting aperture. The first and second apertures 524 and 525, the lens portion 556, and the exit aperture(s) 565 may be configured according to the teachings of the '079 patent, for example, in various embodiments. However, such configurations are exemplary only, and not limiting.

In operation, the light generating portion 516 radiates source light 507 to the second turning mirror 519 which deflects the source light 507 along the source light path SLP (approximately parallel to the measuring axis direction MA) to the first turning minor 528. The turning mirror 528 receives the source light 507 along the source light path SLP, regardless of position along the measuring axis direction MA, and outputs it along an internal light path 510 that translates along the measuring axis direction MA with the moving aperture arrangement 520. An optional diffuser 527 maybe positioned along the internal light path 510, according to previously outlined principles. In any case, the aperture configuration 523 inputs the source light 507 along the internal light path 510 and outputs measurement light 530 to the first and second detection tracks DT1 and DT2.

In this particular embodiment, the aperture configuration 523 comprises the apertures 524 and 525 which output measurement light 530 through the lens portion 556 and the exit aperture(s) 565 to the optical first and second detection tracks DT1 and DT2 to form measurement spots 531 and 532. When the diffuser 527 is used, it may enhance the uniformity of the resulting measurement light 530 to improve measurement accuracy as taught in the '079 patent. The lens portion 556 and the exit aperture(s) 565 are useful to increase the intensity and reduce the size of the measuring spots 531 and a measuring spot 532 on the PSDs of the multiple PSD arrangement, at least along the measuring axis direction MA, to provide high resolution measurements. In one embodiment, the lens portion 556 may comprise a cylindrical lens having a cylinder axis that spans the apertures 524 and 525. In another embodiment, the lens portion 556 may comprise two half ball lenses positioned along the optical axes of the apertures 524 and 525.

While the preferred embodiment of the invention has been illustrated and described, numerous alternative combinations and variations in the illustrated and described arrangements of features and operation will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A position sensing device comprising:
 a light source arrangement configured to radiate source light along a source light path, the light source arrangement comprising at least a light generating portion;
 a moving aperture arrangement constrained to move along a measuring axis direction and located to receive the source light along a source light path, the moving aperture arrangement including an aperture configuration that inputs the source light and outputs measurement light to first and second detection tracks which are aligned along the measuring axis direction and are spaced apart transverse to the measuring axis direction, the measurement light moving along the measuring axis direction corresponding to a position of the aperture configuration along the measuring axis direction, the aperture configuration movable at least over a total measuring range MR along the measuring axis direction; and
 a multiple position sensitive detector (PSD) arrangement, wherein:
 the multiple PSD arrangement comprises:
  a first position sensitive detector comprising a photodetector having a sensitive axis aligned along the first detection track to receive measurement light from the aperture configuration; and
  a second position sensitive detector comprising a photodetector having a sensitive axis aligned along the second detection track to receive measurement light from the aperture configuration;
 the first position sensitive detector and the second position sensitive detector are arranged such that during operation, the first position sensitive detector outputs a first displacement signal over a first detector range that is less than the total measuring range MR, and the second position sensitive detector outputs a second displacement signal over a second detector range that is less than the total measuring range MR and different than the first detector range; and
 the first and second detector ranges share a common portion of the total measuring range MR.

2. The position sensing device of claim 1, wherein the aperture configuration comprises a first aperture and a second aperture configured to receive source light and output measurement light which forms a first measurement spot and a second measurement spot along the first and second detector tracks respectively.

3. The position sensing device of claim 2, wherein the first position sensitive detector and the second position sensitive detector each have a width which is at least twice the width of the first measurement spot and the second measurement spot, respectively.

4. The position sensing device of claim 2, wherein the first position sensitive detector and the second position sensitive detector each have a width which is at least three times the width of the first measurement spot and the second measurement spot, respectively.

5. The position sensing device of claim 2, wherein the common portion spans a dimension along the measuring axis direction which is larger than each of the first and second measurement spots along the measuring axis direction.

6. The position sensing device of claim 1, wherein the light source arrangement is fixed relative to the multiple PSD arrangement.

7. The position sensing device of claim 1, wherein the light source arrangement is configured to move with the moving aperture arrangement.

8. The position sensing device of claim 1, wherein the aperture configuration has an optical axis approximately perpendicular to the measuring axis, and the source light path is approximately parallel to the measuring axis, and the moving aperture arrangement comprises a first turning mirror that is fixed to the moving aperture arrangement and which receives source light along the source light path and deflects it along the optical axis to the aperture configuration.

9. The position sensing device of claim 8, wherein the moving aperture arrangement comprises a diffuser arranged between the first turning mirror and the aperture configuration.

10. The position sensing device of claim 8, wherein the light source arrangement comprises a second turning mirror which receives source light from the light generating portion and deflects it along the source light path to the first turning minor.

11. The position sensing device of claim 10, wherein the light source arrangement is fixed relative to the multiple PSD arrangement.

12. The position sensing device of claim 1, wherein the light source arrangement comprises a diffuser arranged to receive light from the light generating portion and radiate diffuse source light along the source light path.

13. The position sensing device of claim 1, wherein the aperture configuration comprises a single aperture configured to receive source light and output measurement light which forms a single measurement spot with a width which covers both the first detector track and the second detector track.

14. The position sensing device of claim 13, wherein the common portion spans a dimension along the measuring axis direction which is larger than the single measurement spot along the measuring axis direction.

15. The position sensing device of claim 1, wherein:
 the aperture configuration is configured to input the source light and output the measurement light to first, second, and third detection tracks which are aligned along the measuring axis direction and are spaced apart transverse to the measuring axis direction;
 the multiple PSD arrangement further comprises at least a third position sensitive detector comprising a photodetector having a sensitive axis aligned along the third detection track to receive measurement light from the aperture configuration; and
 the second position sensitive detector and the third position sensitive detector are arranged such that during operation, the second position sensitive detector outputs the second displacement signal over the second detector range, and the third position sensitive detector outputs a third displacement signal over a third detector range that is less than the total measuring range MR and different than the first and second detector ranges; and the second and third detector ranges share a common portion of the total measuring range MR.

16. The position sensing device of claim 15, wherein the aperture configuration comprises a first aperture, a second aperture, and a third aperture configured to receive source light and output measurement light which forms a first measurement spot, a second measurement spot, and a third measurement spot along the first, second, and third detector tracks, respectively.

17. The position sensing device of claim 1, wherein:
the multiple PSD arrangement further comprises at least a third position sensitive detector comprising a photodetector having a sensitive axis aligned along the first detection track to receive measurement light from the aperture configuration; and
the second position sensitive detector and the third position sensitive detector are arranged such that during operation, the second position sensitive detector outputs the second displacement signal over the second detector range, and the third position sensitive detector outputs a third displacement signal over a third detector range that is less than the total measuring range MR and different than the first and second detector ranges; and
the second and third detector ranges share a common portion of the total measuring range MR.

18. The position sensing device of claim 1, wherein:
the multiple PSD arrangement further comprises at least a fourth position sensitive detector comprising a photodetector having a sensitive axis aligned along the second detection track to receive measurement light from the aperture configuration; and
the third position sensitive detector and the fourth position sensitive detector are arranged such that during operation, the third position sensitive detector outputs the third displacement signal over the third detector range, and the fourth position sensitive detector outputs a fourth displacement signal over a fourth detector range that is less than the total measuring range MR and different than the first, second, and third detector ranges; and
the third and fourth detector ranges share a common portion of the total measuring range MR.

19. The position sensing device of claim 18, wherein the aperture configuration comprises a first aperture, a second aperture configured to receive source light and output measurement light which forms a first measurement spot and a second measurement spot along the first and second detector tracks, respectively.

* * * * *

UNITED STATES PATENT AND TRADEMARK OFFICE
CERTIFICATE OF CORRECTION

PATENT NO. : 8,400,643 B2  
APPLICATION NO. : 13/088267  
DATED : March 19, 2013  
INVENTOR(S) : K. Atherton Page 1 of 1

It is certified that error appears in the above-identified patent and that said Letters Patent is hereby corrected as shown below:

In the Claims

Column      Line

12      37      "minor" should read --mirror--  
(Claim 10, line 5)

Signed and Sealed this  
First Day of October, 2013

Teresa Stanek Rea  
*Deputy Director of the United States Patent and Trademark Office*